(12) United States Patent  
Kurakane

(10) Patent No.: US 7,315,751 B2  
(45) Date of Patent: Jan. 1, 2008

(54) PORTABLE APPARATUS INCLUDING IMPROVED POINTING DEVICE

(75) Inventor: Hiroshi Kurakane, Tokyo (JP)

(73) Assignee: NEC Corporation, Tokyo (JP)

( * ) Notice: Subject to any disclaimer, the term of this patent is extended or adjusted under 35 U.S.C. 154(b) by 986 days.

(21) Appl. No.: 10/393,047

(22) Filed: Mar. 21, 2003

(65) Prior Publication Data

US 2004/0204067 A1 Oct. 14, 2004

(30) Foreign Application Priority Data

Mar. 28, 2002 (JP) ............................. 2002-090171

(51) Int. Cl.
- *H04B 1/38* (2006.01)
- *H04M 1/00* (2006.01)
- *G06F 3/33* (2006.01)

(52) U.S. Cl. ............................. 455/556.1; 455/556.2; 455/566; 345/157; 345/158

(58) Field of Classification Search ............. 455/550.1, 455/556.1, 556.2, 566; 345/157, 158; *G06F 3/33*
See application file for complete search history.

(56) References Cited

U.S. PATENT DOCUMENTS 7,058,432 B2 * 6/2006 Nishimoto ............... 455/575.1

FOREIGN PATENT DOCUMENTS

| CN | 1251435 | 4/2000 |
| CN | 1331551 | 1/2002 |
| GB | 2 336 749 A | 10/1999 |
| JP | 1-106581 A | 4/1989 |
| JP | 4-123121 A | 4/1992 |
| JP | 5-224808 A | 9/1993 |
| JP | 7-93089 A | 4/1995 |
| JP | 11-167453 A | 6/1999 |
| JP | 11-345073 A | 12/1999 |
| JP | 2002-62984 A | 2/2002 |

* cited by examiner

*Primary Examiner*—Harry S. Hong  
(74) *Attorney, Agent, or Firm*—Sughrue Mion, PLLC

(57) ABSTRACT

A portable apparatus includes a housing, a display device disposed on the housing, an imaging device disposed on the housing to capture an image, and a processor displaying a pointer on the display device. The processor moves the pointer in response to shift of the image caused by movement of the housing.

20 Claims, 7 Drawing Sheets

Fig. 1A
Fig. 1B
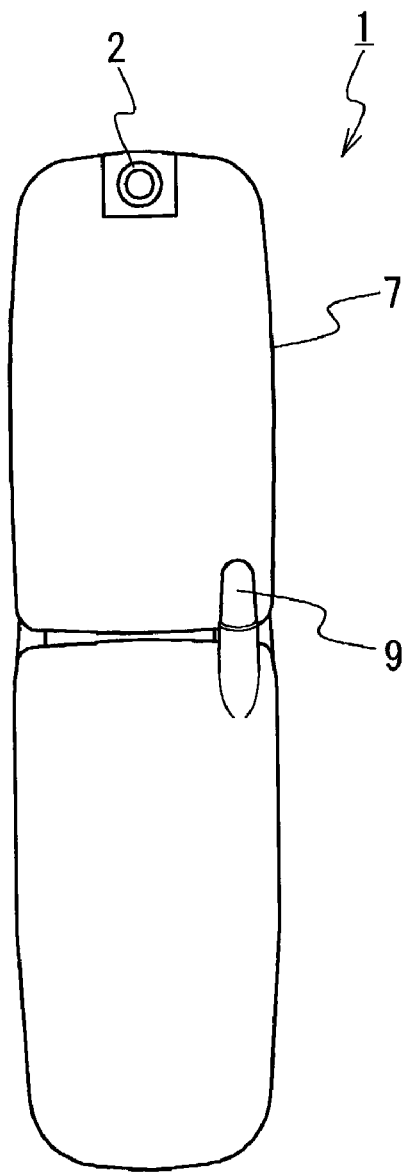
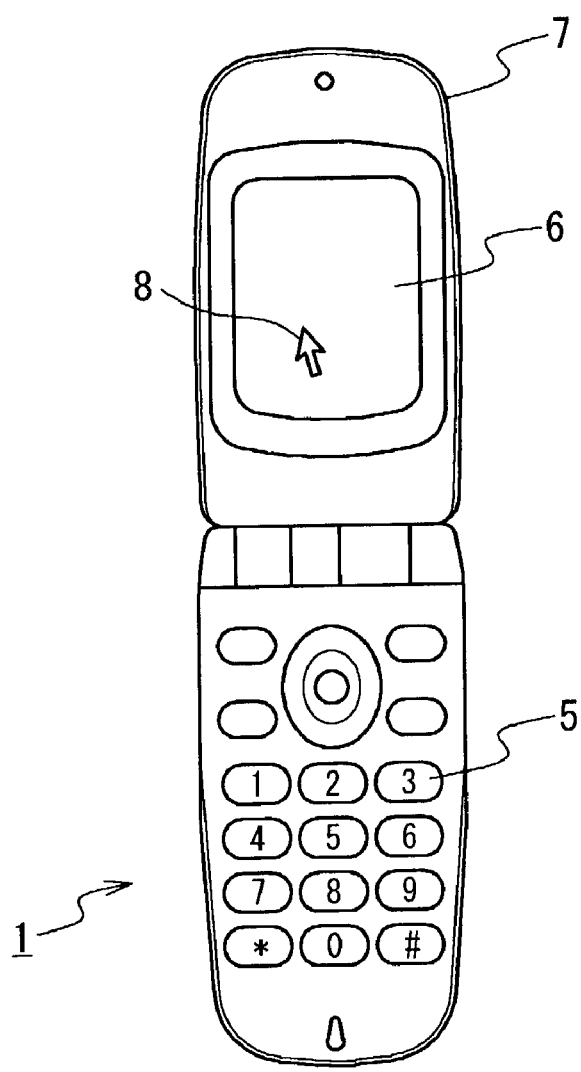

Fig. 7A
Fig. 7B
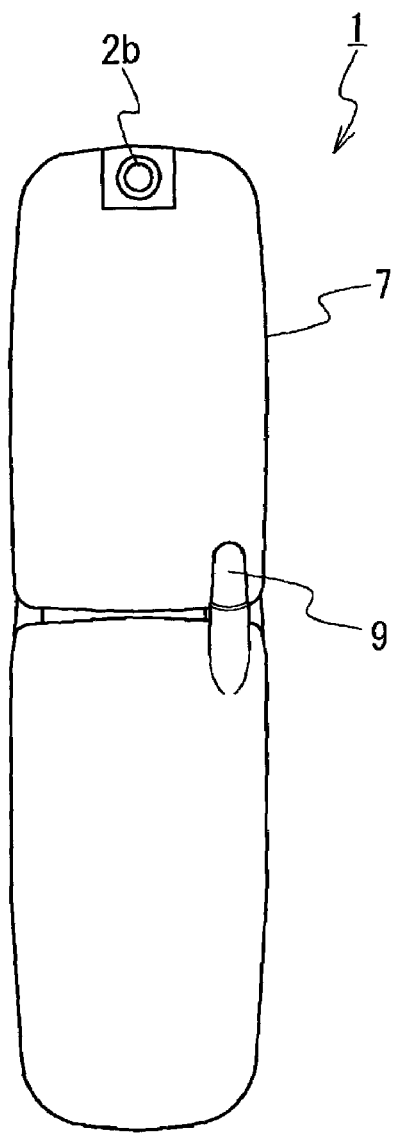
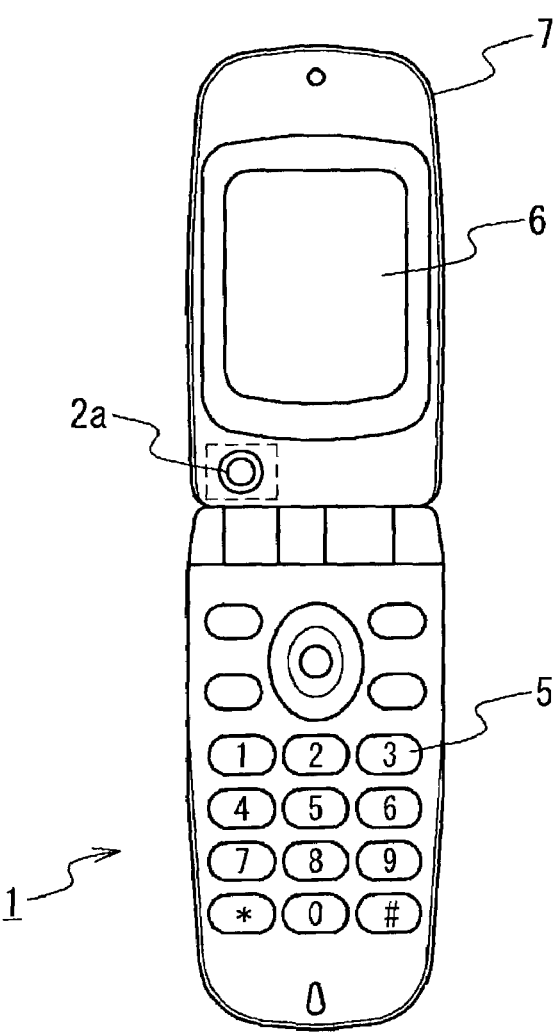

PORTABLE APPARATUS INCLUDING IMPROVED POINTING DEVICE

BACKGROUND OF THE INVENTION

1. Field of the Invention

The present invention is related, in general, to a portable apparatus, and more particularly, to a pointing device for portable apparatuses such as portable phones and personal digital assistants.

2. Description of the Related Art

Recent progress in functions of portable electronic apparatuses, such as portable phones and personal digital assistants, requires a user-friendly man-machine interface to help users make use of the functions.

A mouse is one of the prevailing man-machine interfaces. A mouse allows a user to move a pointer and to select an item shown on a display screen to provide the portable apparatus with the user's instructions.

A mouse, however, is not suitable for a portable apparatus. A large volume of a mouse makes it inconvenient to be used with a portable apparatus. In addition, a mouse requires considerable space to be operated by a user.

Other pointing devices are disclosed in Japanese Open Laid Patent Application (Jp-A-Heisei 4-123121, Jp-A-Heisei 5-224808, Jp-A-Heisei 11-167453). The disclosed pointing devices include an imaging device and operate the pointer in response to an image captured by the imaging device. However, none of the pointing device is designed for a portable apparatus.

A portable data assistant is disclosed in Japanese Open Laid Patent Application (Jp-A-Heisei 11-345073) which includes an image-based pointing device. The disclosed pointing device includes an imaging device capturing an image of the user of the portable apparatus. The pointing device detects the user's motion on the basis of the captured image, and operates in response to the user's motion. The user's motion includes a blink of the eye, a nod or a shake of the head, and a motion of the mouse.

An image editor apparatus including an image-based pointing device is disclosed in Japanese Open Laid Patent Application (Jp-A-Heisei 7-93089). The pointing device stores therein an image of a specific part of a user's body, such as the user's nose, and detects the movement of the specific part on the basis of an image captured by an imaging device. The pointing device then moves the pointer in response to the movement of the specific part. The document discloses that such a pointing device allows the image editor apparatus to be miniaturized or to be portable.

SUMMARY OF THE INVENTION

An object of the present invention is to provide a portable apparatus including a user-friendly pointing device.

Another object of the present invention is to provide a portable apparatus including a user-friendly pointing device that needs reduced image processing.

In an aspect of the present invention, a portable apparatus includes a housing, a display device disposed on the housing, an imaging device disposed on the housing to capture an image, and a processor displaying a pointer on the display device. The processor moves the pointer in response to shift of the image caused by movement of the housing.

The processor preferably selects one of first and second directions to move the pointer in the selected direction, the first direction corresponding to a direction of the shift of the image, and a second direction being opposite to the first direction.

When the imaging device is connected to the housing such that an image-capturing direction of the imaging device is variable, the preferably processor determines the selected direction in response to the image-capturing direction. The imaging device may be pivotably connected to the housing or include first and second imaging cameras that face in opposite directions.

When the portable apparatus further includes an input device for operation by a user, the processor preferably determines the selected direction in response to a reverse instruction produced by the input device.

In this case, the processor preferably determines the selected direction in response to the image-capturing direction and the reverse instruction, when the imaging device is connected to the housing such that an image-capturing direction of the imaging device is variable.

In another aspect of the invention, a portable phone includes a housing, a radio circuitry disposed in the housing to establish a phone call, a display device disposed on the housing, an imaging device disposed on the housing to capture an image, and a processor displaying a pointer on the display device. The processor moves the pointer in response to shift of the image caused by movement of the housing.

In still another aspect of the present invention, a method of controlling a pointer includes:

providing the portable apparatus which includes a housing, a display device disposed on the housing, an imaging device disposed on the housing to capture an image, and a processor disposed in the housing to display the pointer on the display device in response to shift of the image, and moving the housing.

In yet still another aspect of the present invention, a method of controlling a pointer includes:

providing a portable phone which includes a housing, a radio circuitry disposed in the housing to establish a phone call, a display device disposed on the housing, an imaging device disposed on the housing to capture an image, and a processor disposed in the housing to display the pointer on the display device in response to shift of the image, and moving the housing.

BRIEF DESCRIPTION OF THE DRAWINGS

FIGS. 1A and 1B show a portable phone in accordance with the present invention;

FIGS. 7A and 7B show another modification of the portable phone 1 in accordance with the present invention.

DESCRIPTION OF THE PREFERRED EMBODIMENTS

Figure 2:
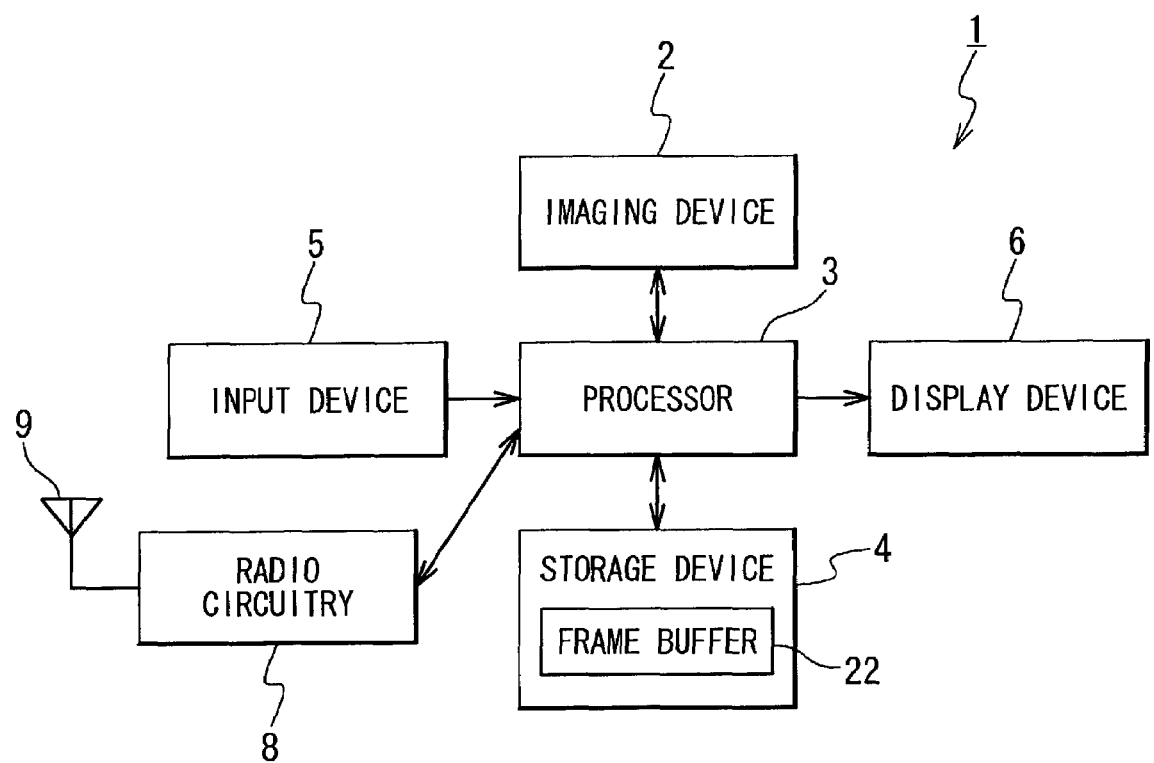
FIG. 2 shows a block diagram of the portable phone.

A portable apparatus in accordance with the present invention will be described in detail with reference to the attached drawings.

In one embodiment, a portable phone 1 includes a housing 7 as shown in FIGS. 1A and 1B. An imaging device 2, preferably including a CCD (charge carrying device) camera, an input device 5, such as a keyboard, and a display device 6, such as an LCD (liquid crystal display), are disposed on the housing 7.

As shown in FIG. 2, the portable phone 1 further includes a processor 3, such as a CPU (central processing unit), a storage device 4, and a radio circuitry 8, which are disposed in the housing 7. The processor 3 controls the entire portable phone 1. The storage device 4 includes a frame buffer 22 for storing an image captured by the imaging device 2. The radio circuitry 8 is connected to an antenna 9. The radio circuitry 8 and the antenna 9 are used to establish, that is, receive or send a phone call as are known in the art.

As shown in FIG. 1B, the processor 3 displays a pointer 8 on the display device 6. The movement of the pointer 8 is controlled by the processor 3 in response to the image captured by the imaging device 2.

Figure 3:
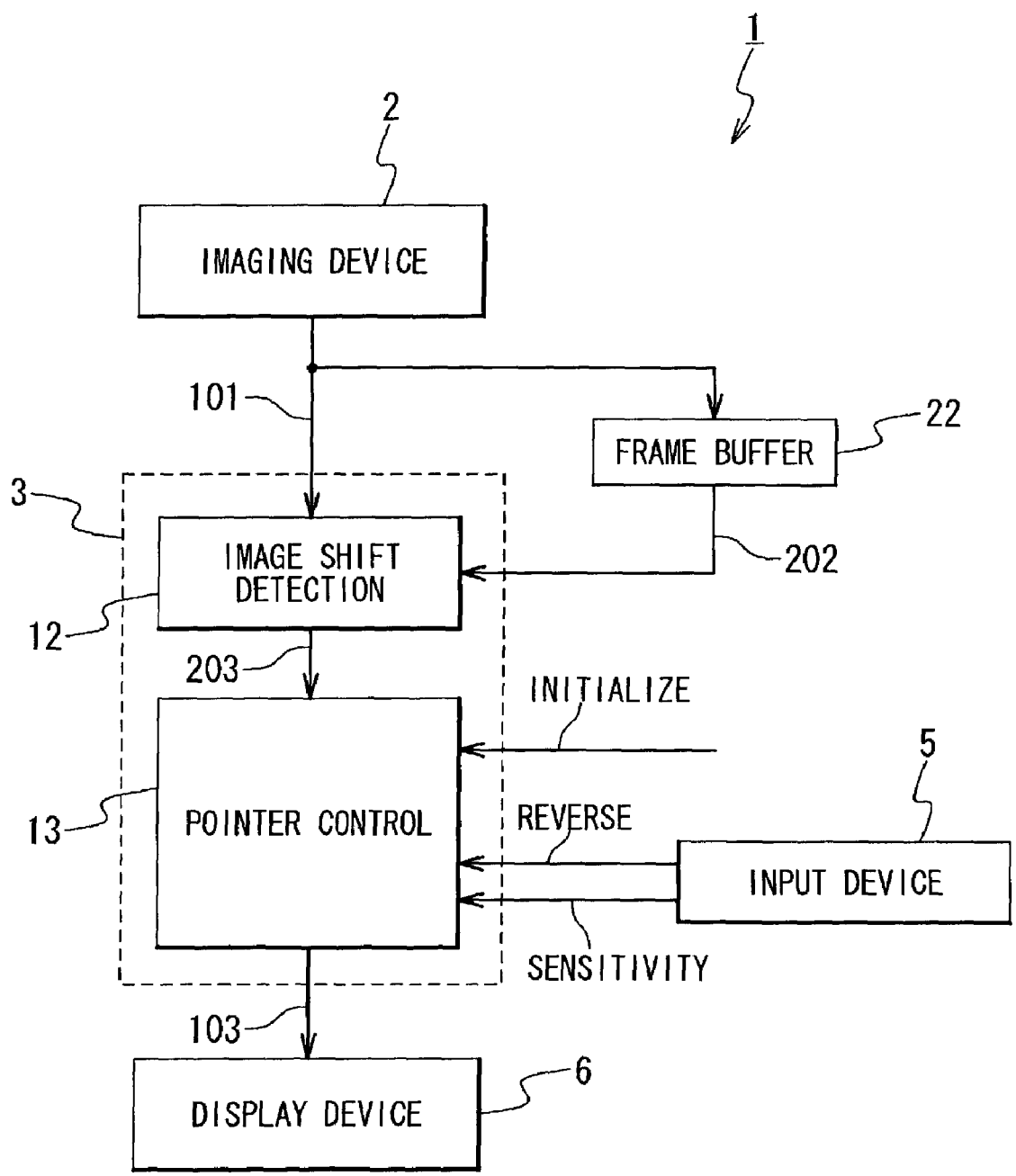
FIG. 3 shows a function diagram of the portable phone.

FIG. 3 shows a function diagram of the portable phone 1. The imaging device 2 sequentially captures images at predetermined time intervals. The captured images 101 are sequentially provided for the processor 3 and the frame buffer 22.

The frame buffer 22 stores therein a previous image 202. When an image 101 is newly captured by the imaging device 2, the frame buffer 22 provides the previous image 202 for the processor 3, and then updates the previous image 202 to the newly captured image 101.

The latest captured image 101 and the previous image 202 are provided for the processor 3. The processor 3 detects the shift of the image captured by the imaging device 2 on the basis of the latest captured image 101 and the previous image 202, and moves the pointer 8 in response to the detected shift of the image.

In detail, the control of the pointer 8 is achieved by an image shift detection function 12 and a pointer control function 13 provided for the processor 3.

The image shift detection function 12 detects the shift of the image captured by the imaging device 2 on the basis of the latest image 101 and the previous image 202 to produce image shift data 203 representative of a shift direction and a shift distance. The detection of the shift of the image is achieved through a pattern matching between the latest image 101 and the previous image 202.

The pointer control function 13 determines the position of the pointer 8 in response to the image shift data 203, and provides a display control signal 103 for the display device 6 to position the pointer 8 at the determined position on the display device 6.

The processor 3 receives an initialize instruction INITIALIZE. The processor 3 positions the pointer 8 at a predetermined initial position, typically at the center of the display screen of the display device 6, in response to the initialize instruction INITIALIZE being activated. The initialize instruction INITIALIZE may be activated in response to the portable phone 1 being started up, or an operation conducted by the user on the input device 5. The initial position of the pointer 8 may be predetermined and stored in the storage device 4, or inputted by the user through the input device 5.

In addition, the processor 3 receives a reverse instruction REVERSE and a sensitivity instruction SENSITIVITY from the input device 5 in response to an operation conducted by the user on the input device 5.

The processor 3 is responsive to the reverse instruction REVERSE to determine the direction in which the pointer 8 is moved. When the reverse instruction REVERSE is not activated, the processor 3 moves the pointer 8 in a first direction corresponding to the direction of the shift of the captured image. When the reverse instruction 206 is activated, on the other hand, the processor 3 moves the pointer 8 in a second direction opposite to the first direction. The user can select desired one of the first and second directions by operating the input device 5.

The processor 3 is responsive to the sensitivity instruction 303 to determine the distance over which the pointer 8 moves. The sensitivity instruction SENSITIVITY indicates the rate of the distance of the movement of the pointer 8 to the distance of the shift of the captured image. The user can adjust the speed at which the pointer 8 is moved by providing the sensitivity instruction 303.

The architecture thus described allows the user to control the position of the pointer 8 by moving or rotating the housing 7 of the portable phone 1. The following is the procedure of controlling the pointer 8.

When the portable phone 1 is started up, the pointer 8 is positioned at the initial position.

An image 101 is then captured by the imaging device 2. The captured image 101 is stored in the frame buffer 22 as the previous image 202. The previous image 202 is provided for the processor 3.

The processor 3 defines a characterizing portion in the previous image 202 in response to the present position of the pointer 8. For example, when the pointer 8 is positioned at the center of the display screen of the display device 6, the characterizing portion is defined as being a region including the center of the previous image 202.

Another image 101 is then newly captured by the imaging device 2. The movement or rotation of the housing 7 before newly capturing the image 101 causes the characterizing portion defined in the previous image 202 to be shifted in the latest captured image 101.

The processor 3 executes a pattern matching to find a region in the latest image 101 substantially matching the defined characterizing portion to determine the direction and the distance of the shift of the characterizing portion. The processor 3 produces the image shift data 203 so as to represent the detected direction and distance of the shift of the characterizing portion.

The processor 3 then determines the direction and distance of the movement of the pointer 8 in response to the image shift data 203. The direction of the movement of the pointer 8 is reversible in response to the reverse instruction REVERSE. The processor 3 selects one of the first and second directions in response to the reverse instruction REVERSE, the first direction corresponding to the direction in which the characterizing portion is shifted, and the second direction being opposite to the first direction. Furthermore, the processor 3 determines the distance over which the pointer 8 is moved, in response to the sensitivity instruction SENSITIVITY.

The processor 3 then moves the pointer 8 in the selected direction over the determined distance.

The same goes every time the imaging device captures another image 101.

Figure 4:
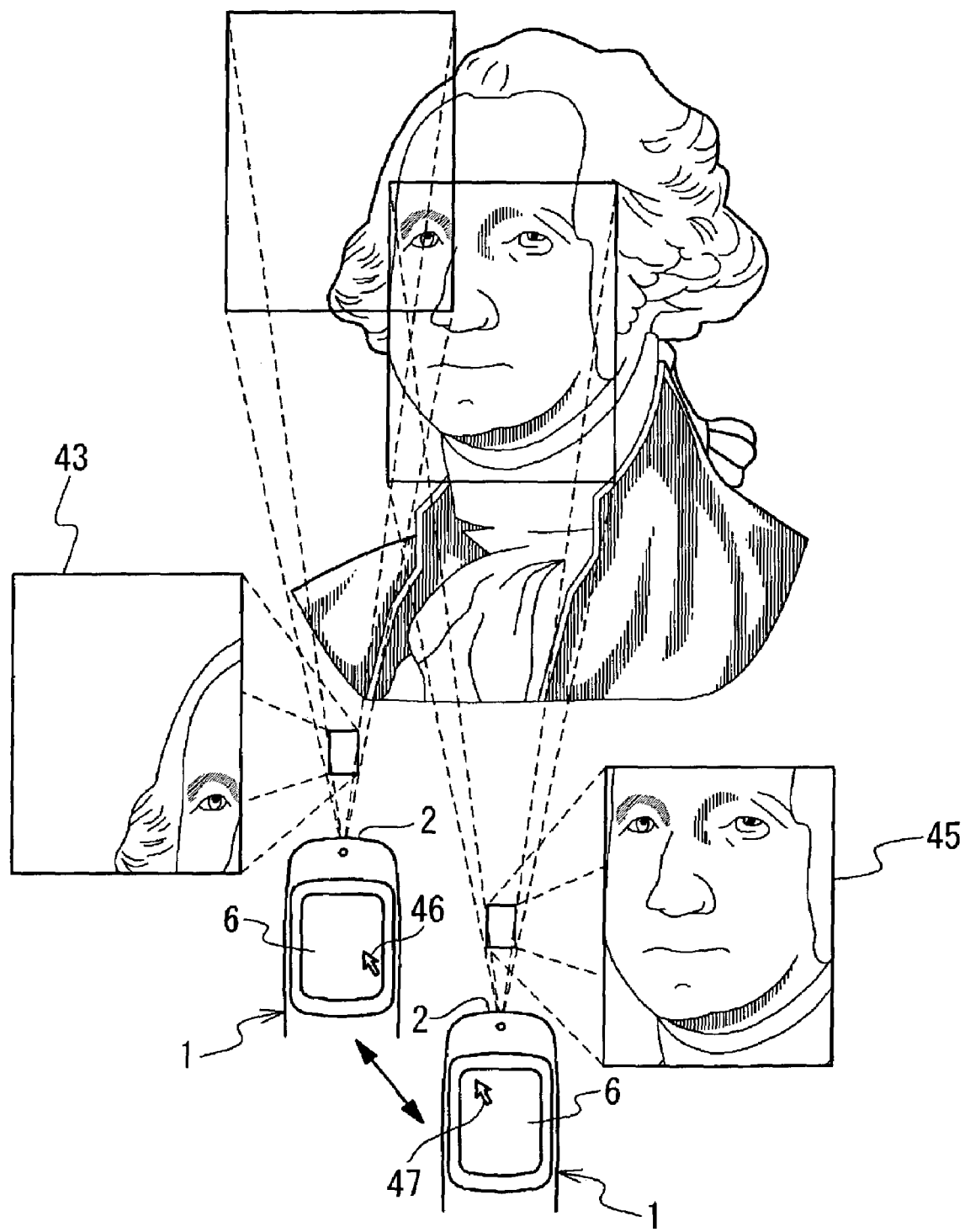
FIG. 4 shows an example of the operation of the portable phone.

FIG. 4 shows an exemplary procedure of controlling the movement of the pointer 8. Let the image 43 be captured and stored in the frame buffer 22 as the previous image 202 when the pointer 8 is positioned at the position 46. The movement of the portable phone 1, including the rotation and the shift of the portable phone 1 causes the shift of the image captured by the imaging device 2. When another image 45 is then captured by the imaging device 2 as the latest image 101, the pointer 8 is moved to the position 47.

Figure 5:
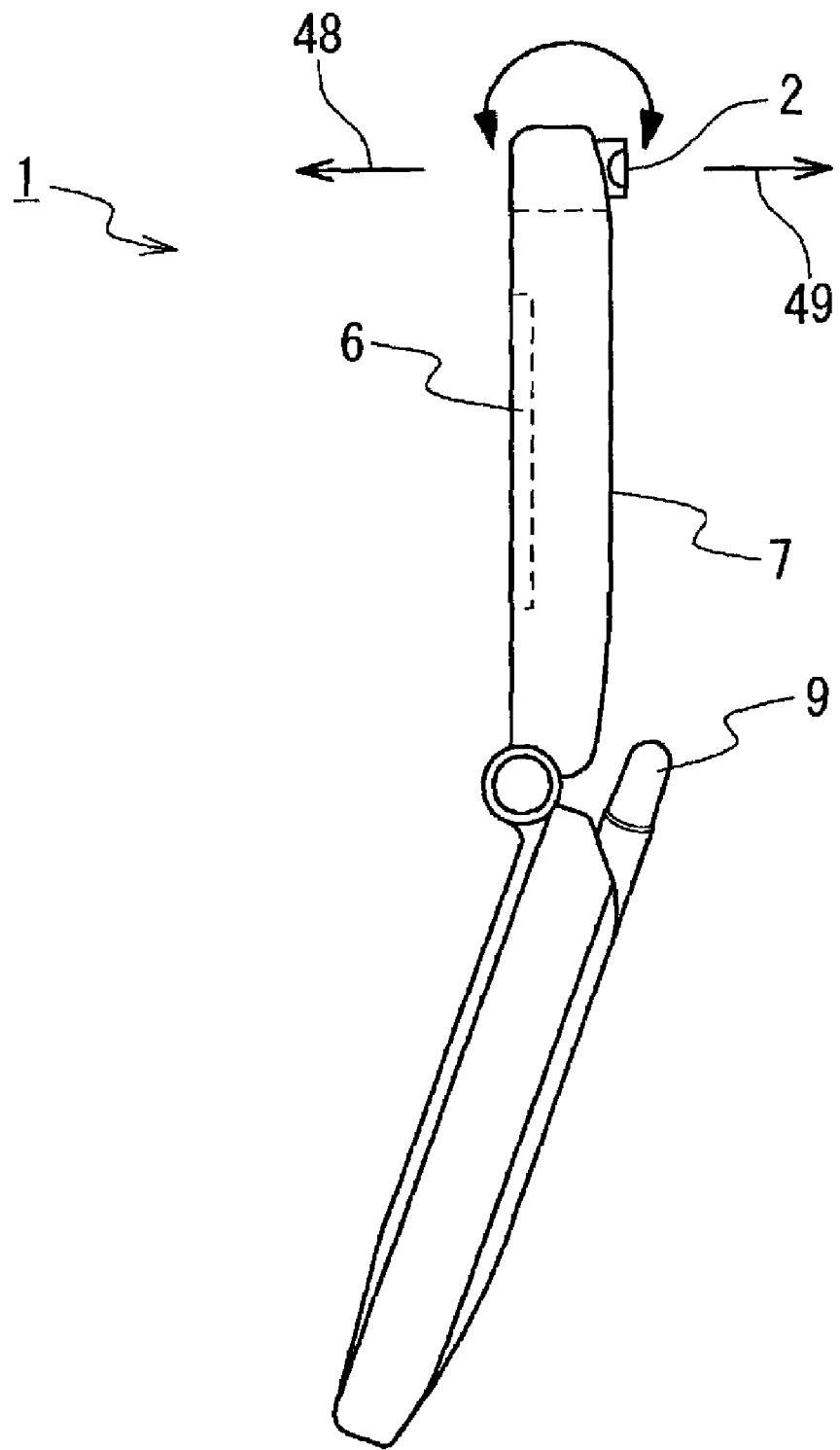
FIG. 5 shows a modification of the portable phone 1 in accordance with the present invention.

In an alternative embodiment, as shown in FIG. 5, the imaging device 2 is pivotably or rotatably connected to the housing 7. The pivotable connection of the imaging device 2 to the housing 7 allows an image-capturing direction of the imaging device 2 to be reversible, the image-capturing direction being the direction in which the imaging device 2 faces to capture the images. The imaging device 2 is allowed to face in both of first and second directions opposite to each other, which are respectively represented by arrows 48 and 49.

Figure 6:
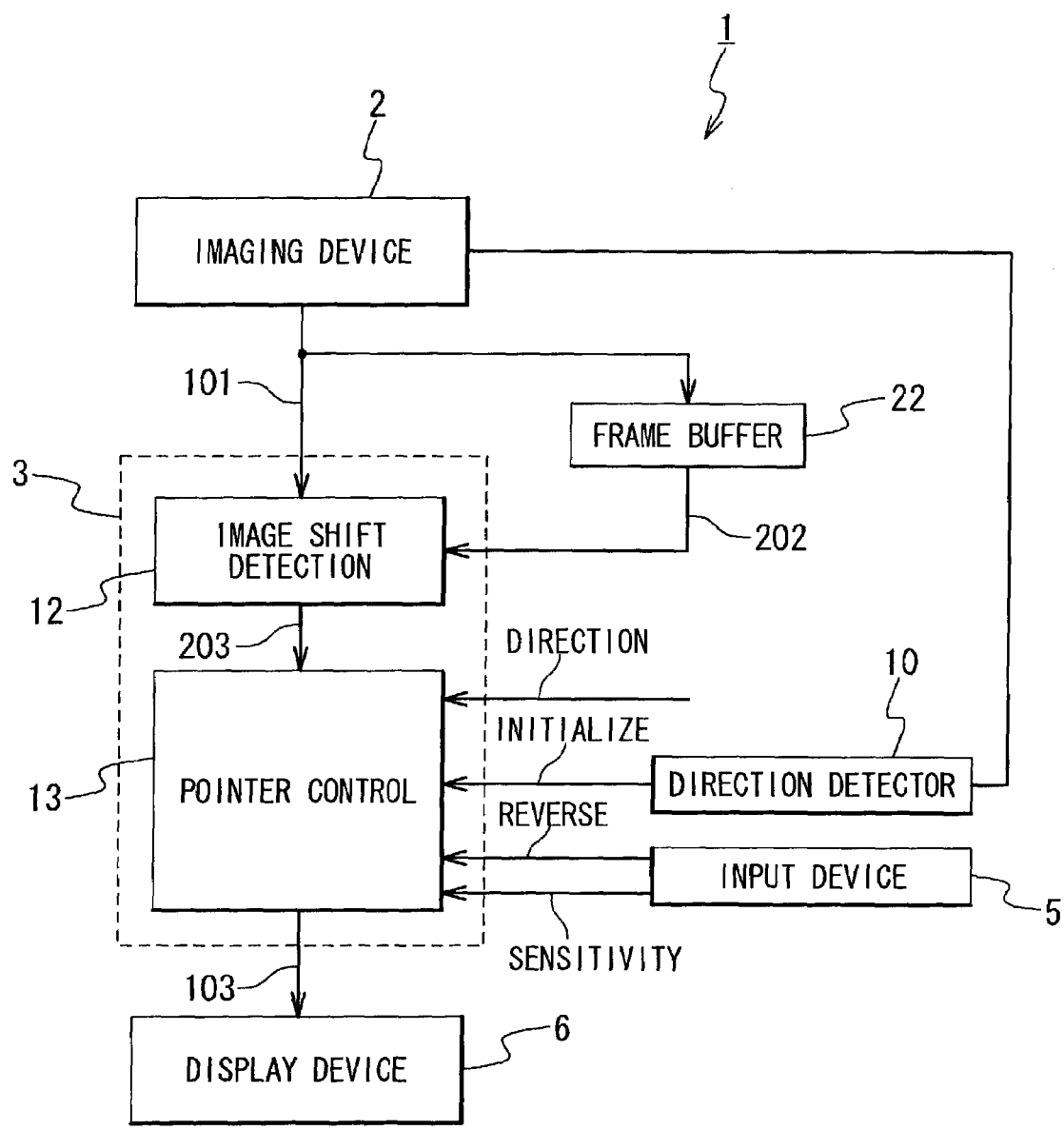
FIG. 6 shows a block diagram of the modified portable phone.

In this embodiment, the direction of the movement of the pointer 8 is variable and reversible in response to the image-capturing direction of the imaging device 2" as well as the reverse instruction REVERSE produced by the input device 5. As shown in FIG. 6, a direction detector circuit 10 is provided for the portable phone 1. The direction detector circuit 10 detects the direction of the imaging device 2, and produces a direction signal DIRECTION representative of the direction of the imaging device 2. The processor 3 selects one of the aforementioned first and second directions in response to the direction signal DIRECTION and the reverse instruction REVERSE, and moves the pointer 8 in the selected direction. The reversibility of the movement of the pointer 8 in response to the direction signal DIRECTION effectively prevents the user from feeling odd when the user controls the position of the pointer 8 by moving or rotating the housing 7 of the portable phone 1.

As shown in FIGS. 7A and 7B, the image-capturing direction of the imaging device 2 may be allowed to be reversible by providing the imaging device 2 with a pair of imaging cameras 2a and 2b which are rigidly disposed on the housing 7 to face in opposite directions. The imaging cameras 2a and 2b are selectively activated in response to operations of the input device 5 conducted by the user. In this case, the direction detector circuit 10 detects the image-capturing direction of the imaging device 2 to produce the direction signal DIRECTION on the basis of which of the imaging cameras 2a and 2b is activated.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

Especially, it should be noted that those who are skilled in the art would appreciate that the above-mentioned architecture for controlling the pointer 8 may be used for other portable apparatuses, such as a digital data assistant.

What is claimed is:

1. A portable apparatus comprising:
a housing;
a display device disposed on said housing;
an imaging device disposed on said housing to capture an image; and
a processor displaying a pointer on said display device, wherein said processor moves said pointer in response to shift of said image caused by movement of said housing.

2. The portable apparatus according to claim 1, wherein said processor moves said pointer in a direction selected from among a first direction corresponding to a direction of said shift of said image and a second direction opposite to said first direction.

3. The portable apparatus according to claim 2, wherein said imaging device is connected to said housing such that an image-capturing direction of said imaging device is variable, and
wherein said processor determines said selected direction in response to said image-capturing direction.

4. The portable apparatus according to claim 3, wherein said imaging device is pivotably connected to said housing.

5. The portable apparatus according to claim 3, wherein said imaging device includes first and second imaging cameras which face in opposite directions.

6. The portable apparatus according to claim 2, further comprising:
an input device for operation by a user, wherein said processor determines said selected direction in response to a reverse instruction produced by said input device.

7. The portable apparatus according to claim 6, wherein said imaging device is connected to said housing such that an image-capturing direction of said imaging device is variable, and
wherein said processor determines said selected direction in response to said image-capturing direction and said reverse instruction.

8. A portable phone comprising:
a housing;
a radio circuitry disposed in said housing to establish a phone call;
a display device disposed on said housing;
an imaging device disposed on said housing to capture an image; and
a processor displaying a pointer on said display device, wherein said processor moves said pointer in response to shift of said image caused by movement of said housing.

9. The portable phone according to claim 8, wherein said processor selectively moves said pointer in a direction selected from a first direction corresponding to a direction of said shift of said image and a second direction opposite to said first direction.

10. The portable phone according to claim 9, wherein said imaging device is connected to said housing such that an image-capturing direction of said imaging device is variable, and
wherein said processor determines said selected direction in response to said image-capturing direction.

11. The portable phone according to claim 10, wherein said imaging device is pivotably connected to said housing.

12. The portable phone according to claim 10, wherein said imaging device includes first and second imaging cameras which faces in opposite directions.

13. The portable phone according to claim 10, further comprising:
an input device for operation by a user, wherein said processor determines said selected direction in response to a reverse instruction produced by said input device.

14. The portable phone according to claim 13, wherein said imaging device is connected to said housing such that an image-capturing direction of said imaging device is variable, and
wherein said processor determines said selected direction in response to said image-capturing direction and said reverse instruction.

15. A method of controlling a pointer for a portable apparatus including:
   a housing,
   a display device disposed on said housing,
   an imaging device disposed on said housing to capture an image, and
   a processor disposed in said housing to display said pointer on said display device in response to shift of said image, said method comprising:
providing said portable apparatus; and
moving said housing.

16. The method according to claim 15, wherein said moving includes shifting said housing.

17. The method according to claim 15, wherein said moving includes rotating said housing.

18. A method of controlling a pointer for a portable phone including:
   a housing,
   a radio circuitry disposed in said housing to establish a phone call,
   a display device disposed on said housing,
   an imaging device disposed on said housing to capture an image, and
   a processor disposed in said housing to display said pointer on said display device in response to shift of said image, said method comprising:
providing said portable apparatus; and
moving said housing.

19. The method according to claim 18, wherein said moving includes shifting said housing.

20. The method according to claim 18, wherein said moving includes rotating said housing.

* * * * *